United States Patent
Yasukawa et al.

(10) Patent No.: US 7,239,738 B2
(45) Date of Patent: Jul. 3, 2007

(54) IMAGE DEFECT INSPECTING APPARATUS AND IMAGE DEFECT INSPECTING METHOD

(75) Inventors: Kaoru Yasukawa, Kanagawa (JP); Koji Adachi, Kanagawa (JP); Norikazu Yamada, Kanagawa (JP); Eigo Nakagawa, Kanagawa (JP); Koki Uwatoko, Kanagawa (JP); Tetsuichi Satonaga, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1059 days.

(21) Appl. No.: 10/377,663

(22) Filed: Mar. 4, 2003

(65) Prior Publication Data
US 2004/0052410 A1 Mar. 18, 2004

(30) Foreign Application Priority Data
Sep. 13, 2002 (JP) ............................ P2002-267919

(51) Int. Cl.
*G06K 9/00* (2006.01)
(52) U.S. Cl. ...................................... 382/141; 382/182
(58) Field of Classification Search ................ 382/181, 382/182, 185–188, 209, 217, 218, 229; 358/1.2, 358/2.1, 3.26
See application file for complete search history.

(56) References Cited

U.S. PATENT DOCUMENTS 6,363,381 B1 * 3/2002 Lee et al. ....................... 707/6
2003/0113000 A1 * 6/2003 Hyoki et al. ................. 382/112

FOREIGN PATENT DOCUMENTS

| JP | 7-121711 | 5/1995 |
| JP | 9-62841 | 3/1997 |

* cited by examiner

*Primary Examiner*—Vikkram Bali
(74) *Attorney, Agent, or Firm*—Morgan, Lewis & Bockius LLP

(57) ABSTRACT

An image defect inspecting apparatus of the present invention includes a template image producing section for producing a template image from reference image data, a corresponding image extracting section for extracting a predetermined image located at a position corresponding to a template image from digital data of a scanned image for inspection, data embedding sections for embedding desired same pattern data into the template image and the image extracted by the corresponding image extracting section, a normalized correlation value calculation processing unit for acquiring a normalized correlation coefficient from the template image and the extracted image, into which the pattern data is embedded, and a defect judging section for judging as to whether a defect is present by comparing the normalized correlation coefficient acquired by the normalized correlation value calculation processing unit with a predetermined threshold value so as to acquire a large/small relationship thereof.

14 Claims, 8 Drawing Sheets

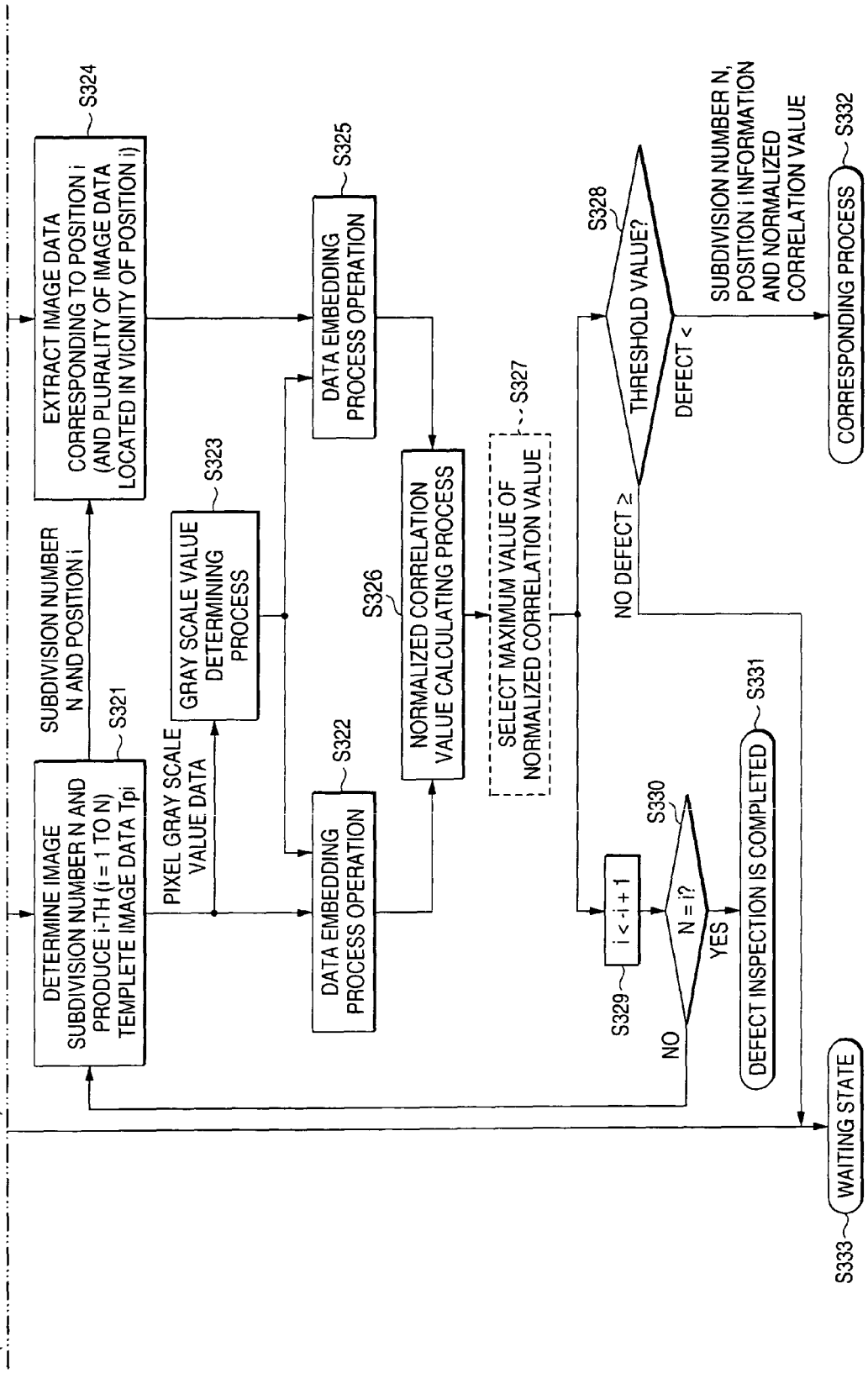

FIG. 4

PIXELS (FOUR) INTO WHICH DATA IS EMBEDDED

PIXELS (FOUR) INTO WHICH DATA IS NOT EMBEDDED

PIXELS (LINE) INTO WHICH DATA IS EMBEDDED

PIXELS (LINE) INTO WHICH DATA IS NOT EMBEDDED

IMAGE DEFECT INSPECTING APPARATUS AND IMAGE DEFECT INSPECTING METHOD

The present disclosure relates to the subject matter contained in Japanese Patent Application No.2002-267919 filed on Sep. 13, 2002, which is incorporated herein by reference in its entirety.

BACKGROUND OF THE INVENTION

1. Field of the Invention

The present invention relates to an image inspecting apparatus and an image inspecting method, and particularly relates to an image inspecting apparatus employed in an image output apparatus for outputting an image recording medium on which an image has been recorded based upon image data and image inspecting method therefor.

2. Description of the Related Art

Conventionally, as a method of inspecting a defect contained in an output image, a defect inspecting method based upon a normalized correlation method has been proposed. This defect inspecting method owns such a merit that a defect inspection can be carried out in a correct manner even when contrast of a scanned image for inspection is different from that of a reference image due to a change in illumination conditions.

A normalized correlation value C between a template image T(i, j) having N×M pixels, which is produced from reference image data, and an image I(i, j), which is extracted from a scanned image for inspection, is calculated in accordance with the following formula 1:

$$C = \frac{\sum_{i=1}^{N}\sum_{j=1}^{M}\{I(i,j) - \mu I\} \cdot \{T(i,j) - \mu T\}}{\sqrt{\sum_{i=1}^{N}\sum_{j=1}^{M}\{I(i,j) - \mu I\}^2 \cdot \sum_{i=1}^{N}\sum_{j=1}^{M}\{T(i,j) - \mu T\}^2}} \quad (1)$$

$$\mu I = \frac{1}{NM} \cdot \sum_{i=1}^{N}\sum_{j=1}^{M} I(i,j)$$

$$\mu T = \frac{1}{NM} \cdot \sum_{i=1}^{N}\sum_{j=1}^{M} T(i,j)$$

The normalized correlation value C becomes 1 when the template image is completely coincident with the image extracted from the scanned image for inspection. On the other hand, the normalized correlation value C becomes −1 when the template image completely disagrees with the image extracted from the scanned image for inspection (when template image and extracted image represent patterns, are inverted in light and shade with each other).

In an actual defect inspecting apparatus, a template image corresponds to ideal defectless data, which contains no noise, whereas a scanned image for inspection corresponds to image data, which is digital data into which an image is converted, which is recorded on an image recording medium and outputted from an image output apparatus. Therefore, errors and noise produced from a converting unit for conducting conversion into digital data are mixed into the scanned image for inspection.

As a result, even when a scanned image for inspection has no defect, normalized correlation value thereof is not always equal to 1. Therefore, when the normalized correlation value is larger than, or equal to a predetermined threshold value, such a judgement can be made that the reference image is coincident with the scanned image for inspection, and thus, the scanned image for inspection has no defect.

As to this defect inspecting method based upon the normalized inspection, several problems have been pointed out and solution measures have been proposed in the following related art.

In "image matching method and image matching apparatus" disclosed in JP-A-Hei.9-62841, when an image has a low gray scale value (dark image portion) such as a background of an image, the defect inspection based on the normalized correlation value in which a portion having a higher correlation value is forcibly sought owns a problem. In this example, while the correlation value C is calculated, the accumulated value of the gray scale values themselves is employed instead of such an accumulated value obtained after gray scale values have been corrected based upon difference between an average level and the gray scale values. As a consequence, such an error contained in the normalized correlation value can be avoided in the dark background where the gray scale value has no value.

Also, in "correlation value correcting apparatus/method of normalized correlative correlation values in pattern matching" disclosed in JP-A-Hei.7-121711, the following problem is pointed out. That is, even when the normalized correlation value is equal to 1, both the scanned image for inspection and the reference image are not always images, which are captured from an object having the same reflectance factor distribution. In this example, a correction amount is determined based on an average value of gray scale values of the reference image, an average value of gray scale values of the scanned image for inspection, a standard deviation of the scanned image for inspection, and a standard deviation of the reference image to correct the correction value.

However, there are some cases that the normalized correlation value cannot be calculated by the template image, which is produced from the reference image in view of the defect inspections executed over the entire area of the output image.

For instance, this case corresponds to a case in which there is no change in gray scale values within the template image of the reference image and the template image is produced in a margin portion located at a peripheral portion of a document where characters are written or a portion having uniform gray scale values such as a figure. In this case, the template image T(i, j) defined in the above-described formula does not depend upon i and j; each of gray scale values within the template image becomes equal to an average value (T(i, j)=μT), a denominator and a numerator of a right hand in the above-described formula becomes zero; and thus, the normalized correlation value C becomes unstable. In other words, when a defect is present at a position of this portion of the scanned image for inspection, the defect inspection cannot be carried out.

In accordance with the technique disclosed in JP-A-Hei.62841, even when there is no change in the gray scale values within the template image of the reference image, the correlation value can be calculated. However, this technique owns the following serious drawback. That is, the higher robustness of the image matching apparatus are lost with respect to the offset variation of the gray scale values of the image and the variation of the illumination light amount, which corresponds to the merit of the defect inspection caused by the normalized correlation of this image matching apparatus.

Also, in the technique disclosed in JP-A-Hei.7-121711, when there is no change in the gray scale values within the template image of the reference image, such a basic problem cannot be solved. That is, this technique cannot calculate the normalized correlation value.

SUMMARY OF THE INVENTION

An object of the present invention is to provide an image defect inspecting apparatus. That is to say, in an image defect inspecting apparatus utilizing the normalized correlation method, even when there is no change in gray scale values within a template image of a reference image, a normalized correlation value can be calculated, a defect can be detected in high precision, and the image defect inspecting apparatus can have a very broad application range without any limitation of an image subject.

The present invention has been made to achieve such an object. In other words, an image defect inspecting apparatus according to the invention compares a reference image data with a scanned image for inspection to judge as to whether an image defect is present on the scanned image for inspection. The scanned image for inspection is output based on the reference image data from an image output apparatus. The scanned image for inspection is formed on an image recording medium. The image defect inspecting apparatus includes an image acquiring unit, a storage unit, a template image producing unit, a corresponding image extracting unit, a data embedding unit, a normalized correlation value calculating unit, and a defect judging unit. The image acquiring unit acquires the scanned image for inspection output from the image output apparatus to convert the acquired scanned image for inspection into digital data. The storage unit stores the reference image data and the digital data converted by the image acquiring unit. The template image producing unit produces a template image from the reference image data. The corresponding image extracting unit extracts a predetermined image located at a position corresponding to the template image from the digital data stored in the storage unit. The data embedding unit embeds desirable same pattern data into the template image and the predetermined image extracted by the corresponding image extracting unit. The normalized correlation value calculating unit calculates a normalized correlation coefficient from the template image and the extracted image, into which the same pattern data are embedded by the data embedding unit. The defect judging unit compares the normalized correlation coefficient calculated by the normalized correlation value calculation unit with a predetermined threshold value to obtain large and small relation therebetween so that it is judged whether the scanned image for inspection contains a defect.

In the image defect inspecting apparatus according to the invention, the predetermined data patterns are embedded into the same positions of the reference image data and the digital data of the scanned image for inspection by the data embedding unit. Therefore, the normalized correlation coefficient is calculated by the normalized correlation value calculating unit by employing both these image data into which these pattern data have been embedded. As a result, even when such an image data has no change in gray scale values thereof, the gray scale change may occur due to the embedded pattern data, so that the normalized correlation coefficient can be calculated.

BRIEF DESCRIPTION OF THE DRAWINGS

FIG. 4 is a diagram for indicating a template image acquired by subdividing a reference image.

DETAILED DESCRIPTION OF THE PREFERRED EMBODIMENTS

Referring now to drawings, embodiment modes of the present invention will be described. In this description, the invention is constructed as a part of a print processing system (an image output apparatus) of a laser printer.

Figure 1:
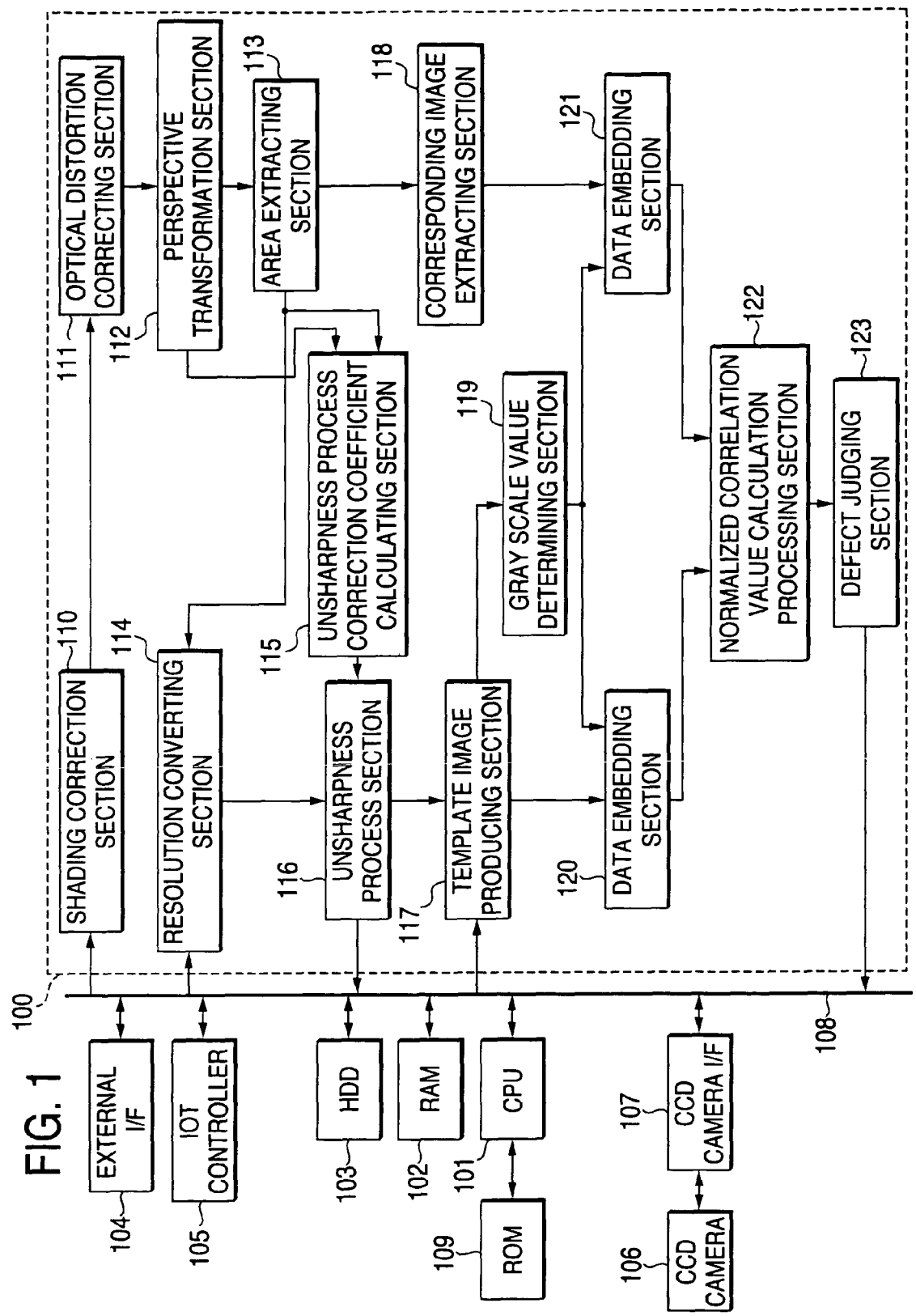
FIG. 1 is a block diagram for explaining an image defect inspecting apparatus according to an embodiment mode of the present invention.

FIG. 1 is a schematic block diagram for explaining the print processing system to which an image defect inspecting apparatus of the invention is applied. The image defect inspecting apparatus is mounted on a laser printer (will be referred to as a "printer" hereinafter) 201 of FIG. 2.

As indicated in FIG. 1, in the print processing system, a CPU 101, a RAM 102, a hard disk drive (HDD) 103, an external interface circuit (external I/F) 104, an IOT controller 105 (IOT: image output terminal), and a CCD camera interface 107 for a CCD camera are mutually connected via a data bus 108 to each other. The external I/F 104 is employed so as to input print data from an external. The print data is described in a page description language. The IOT controller 105 corresponds to an interface circuit for interfacing an image output terminal (IOT not shown) therewith. The image output terminal prints an image on paper based on an electrostatic latent image by utilizing an optical beam produced from a laser beam to output the printed paper. The CCD camera 106 functions as a unit for converting a print image into digital data. The CCD camera interface circuit 107 interfaces the CCD camera 106 with respect to the print processing system.

A ROM 109 for storing a program is connected to the CPU 101. The CPU 101 reads out the program from the ROM 109 to execute the read program at proper timing so as to control a printing control process operation and an image defect inspecting process operation (will be explained later).

Also, the CPU 101 transmits/receives via the data bus 108 to/from other hardware, image data used in print process operation and image defect process operation. As an interface section of the interface circuit 104, for instance, a parallel port, which is connected to a printer board of a personal computer (PC), and/or an Ethernet (R) interface may be employed.

The hard disk drive 103 has a storage area for storing print data, which is entered via the external I/F 104, and another storage area for storing one sheet of print-processed image data, which has been produced by expanding print data to a bit map.

The RAM 102 contains an area required to execute a print process operation, namely, a work area used to execute the print process operation, and a buffer area for buffering image data (the image data obtained by expanding print data into bit map, namely original image data), which is to be sent to the IOT controller 105. Furthermore, the RAM 102 contains an area required to execute an image defect inspecting/processing operation, namely, a work area for executing an image process operation for output inspection and an area for storing captured image data (namely, scanned image for inspection data).

The IOT controller 105 rearranges image data in processing orders by the IOT, and controls the IOT to produce a signal of a laser diode. The CCD camera interface circuit 107 for the CCD camera 106 analog-digital converts (hereinafter referred to as A/D-convert) output data of the CCD camera 106 and then stores the A/D-converted output data into the RAM 102.

Figure 2:
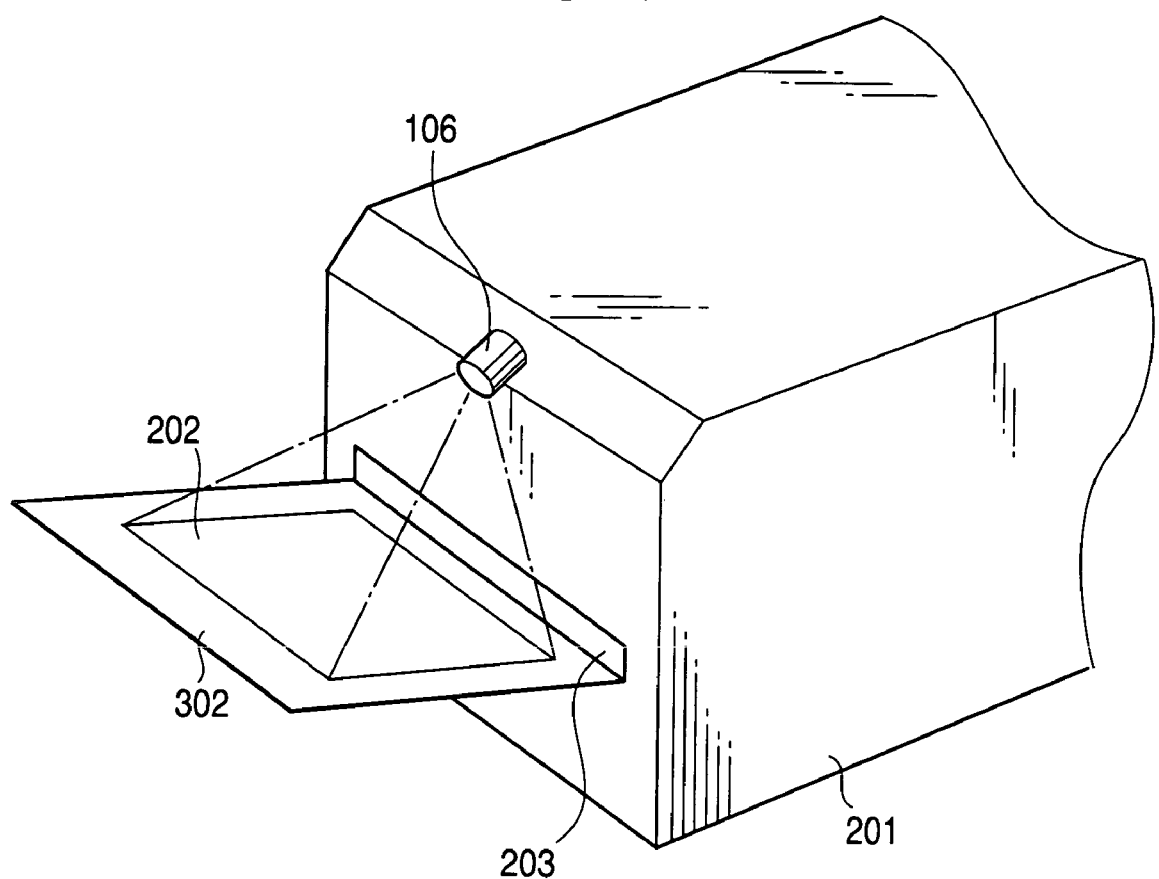
FIG. 2 is an outer view of the image defect inspecting apparatus.

As indicated in FIG. 2, this CCD camera 106 is set to a position where an entire area of a print-processed paper 202 on an upper surface of a paper ejection tray 203 of a printer 201 can be captured.

The image defect detecting process section 100 is mainly constituted by a scanned image for inspection data pre-processing section, a reference image data pre-processing section, and a normalized correlation calculation processing section.

The scanned image for inspection data pre-processing section includes a shading correction section 110, an optical distortion correcting section 111, a perspective transformation section 112, and an area extracting section 113. The scanned image for inspection data (the captured image) is input to the shading correction section 110 via the data bus 108. Both the shading correction and the optical distortion correction are performed so as to correct the characteristics of the CCD camera 106, illumination conditions of capturing operations, and the like.

The perspective transformation section 112 corrects a printed image (image of paper size). In other words, the fluoroscopic conversion is carried out so as to correct an image of the print-processed paper 202 (scanned image for inspection), which is capture along an oblique direction by the CCD camera 106 positioned over the paper ejection tray 203 indicated in FIG. 2. The area extracting section 113 executes a process operation for extracting an area of a required paper size from the scanned image for inspection (the captured image).

The reference image data pre-processing section includes a resolution converting section 114, an unsharpness (vignetting) process correction coefficient calculating unit 115, and an unsharpness process unit 116. The reference image data is input to the resolution converting section 114 via the data bus 108. The resolution converting section converts the reference image so that the resolution of the reference image is coincident with that of the image extracted by the area extracting section 113. Also, the unsharpness process correction coefficient calculating unit 115 calculates a unsharpness process correction coefficient, which corrects an unsharpness degree of an edge portion of a reference image to be substantially equal to an unsharpness degree of an edge portion of a captured image. Then, the unsharpness process unit 116 performs unsharpness process on the reference image based on the unsharpness process correction coefficient.

The normalized correlation calculation processing section includes a template image producing section 117, a corresponding image extracting section 118, a gray scale determining section 119, data embedding sections 120 and 121, a normalized correlation calculation processing section 122, and a defect judging section 123.

The CPU 101 transmits size of the template image to the template image producing section 117 through the data bus 108. The template image producing section 117 cuts out template images, which are required for a normalized correlation value calculation, from data obtained from the reference image data pre-processing section. Specifically, the template image producing section 117 divides the reference image, which is processed by the reference image data pre-processing section, to generate the template images, and sequentially allots number to each template image. The corresponding image extracting section 118 extracts a corresponding image from the data obtained from the scanned image for inspection data pre-processing operation. The corresponding image has the same size as the size of the template image and is located at the same position as the template image. Specifically, at first, the corresponding image extracting section 118 divides the captured image, which is processed by the scanned image for inspection pre-processing section, and allots number to each divided captured image. Then, the corresponding image extracting section 118 outputs, for example, the divided captured image No. 1 (that is, the corresponding image) corresponding to the template image No. 1.

The gray scale value determining section 119 determines gray scale of data to be embedded based on gray scale value data of the template image. In the data embedding sections 120 and 121, data having a specific gray scale value in accordance with a predetermined pattern is embedded into the template image and the corresponding image, respectively. The normalized correlation value calculation processing section 122 calculates normalized correlation value from the template image and the corresponding image. Based on the calculation result, the defect judging section 123 judges as to whether or not a defect is present.

Figure 3:
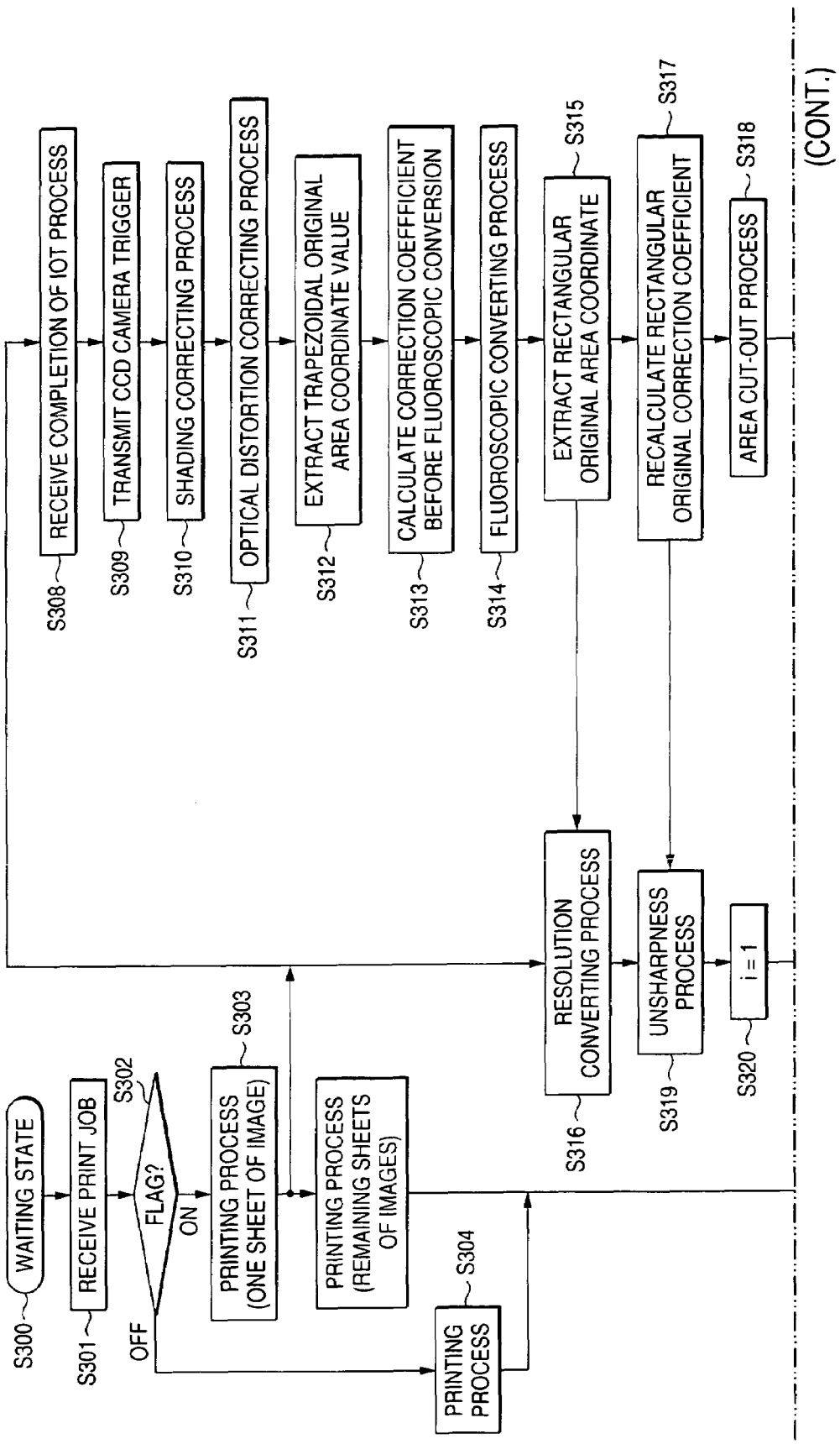
FIG. 3 is a flow chart for describing process sequential operation of the image defect inspecting apparatus.

Next, process operations of the print processing system according to the embodiment will now be explained with reference to a flow chart shown in FIG. 3. When the printer is brought into a waiting state (S300), the CCD camera 106 captures an area located on the paper ejection tray 203 in a periodic manner in response to an instruction issued from the CPU 101 to output a captured image.

The CPU 101 compares the captured image with the image of the paper ejection tray 203 stored in the memory, and thus, judges as to whether or not paper is present on the paper ejection tray 203. When the paper is present on the paper ejection tray 203, the CPU 101 sets an image inspectable flag to OFF, and is directly continued under the waiting state. When the paper is not present on the paper ejection tray 203, the CPU 101 sets the image inspectable flag to ON, and is continuously set under waiting state.

When the CPU 101 receives a print job under waiting condition (S301) and the image inspectable flag (S302) is set to OFF, the CPU 101 executes a normal print process operation (S304). When the image inspectable flag (S302) is set to ON, the CPU 101 executes an image inspection at a first image sheet of the print job.

The CPU 101 performs the print process operation of the first image sheet (S303), transmits the expanded image data to the IOT controller 105, and also stores the expanded image data into the HDD 103. When a rendering process operation of last image data is accomplished, the CPU 101 waits for a first image sheet processing completion signal issued from the IOT controller 105 (S308). When this first image sheet processing completion signal is transmitted, the CPU 101 sends out a trigger signal to the CCD camera 106 after a predetermined time has been elapsed (S309).

The CCD camera 106 turns ON a shutter in synchronism with the trigger signal. At this time, this shutter is turned ON just after printed paper has been outputted on the paper ejection tray 208. When a print job directs a plurality of image sheets and the print process operation of one image sheet defined in the step S303 is ended, the CPU 101 executes the remaining print process operations in parallel to the above-explained image process operation. The image data captured by the CCD camera 106 is converted into a digital image signal by the CCD camera interface circuit 107, and then, the digital image signal is stored in the memory (RAM 102).

The stored image data is processed by the shading correction (S310), and thereafter, is processed by the optical distortion correction (S311). Next, coordinate values in a trapezoidal original area is extracted by using an edge detecting operation (S312) to calculate a correction coefficient before the fluoroscopic converting operation (S313).

Next, the original area having the trapezoidal shape is geometically converted into the original area a rectangular shape by practically performing the fluoroscopic converting process operation (S314). Next, coordinate values in the rectangular original area is extracted from the converted image by utilizing a difference between a color of the paper ejection tray 203 as the background and a white color of an edge of paper (S315), and then, this coordinate values are sent- to a resolution converting process operation of original image data (S316).

Next, a correction coefficient of the rectangular area is recalculated so that the correction coefficient calculated in the step S313 can be applied to the rectangular-converted image (S317). Next, only the original area is cut out from the coordinate values extracted in the step S315 (S318), and then, the cut original area is stored in the memory (RAM 102).

On the other hand, as to the image data stored in the HDD 103, the resolution converting process operation is carried out by using a linear interpolation method or the like based upon the coordinate values of the rectangular original area extracted in the step S315 (S316). Subsequently, the unsharpness process operation is carried out (S319), and then, the resultant image data is stored in the memory (RAM 102). This image data is used as reference image data.

The reason why the unsharpness processing operation is carried out is given as follows: That is, since the reference image data owns ideal gray scale characteristic, the unsharpness process operation is carried out which is equivalent to an unsharpness characteristic, which cannot be removed from a captured image, so that an error occurred at a time when a normalized correlation value calculating process operation (will be discussed later) is performed can be minimized.

Figure 4:
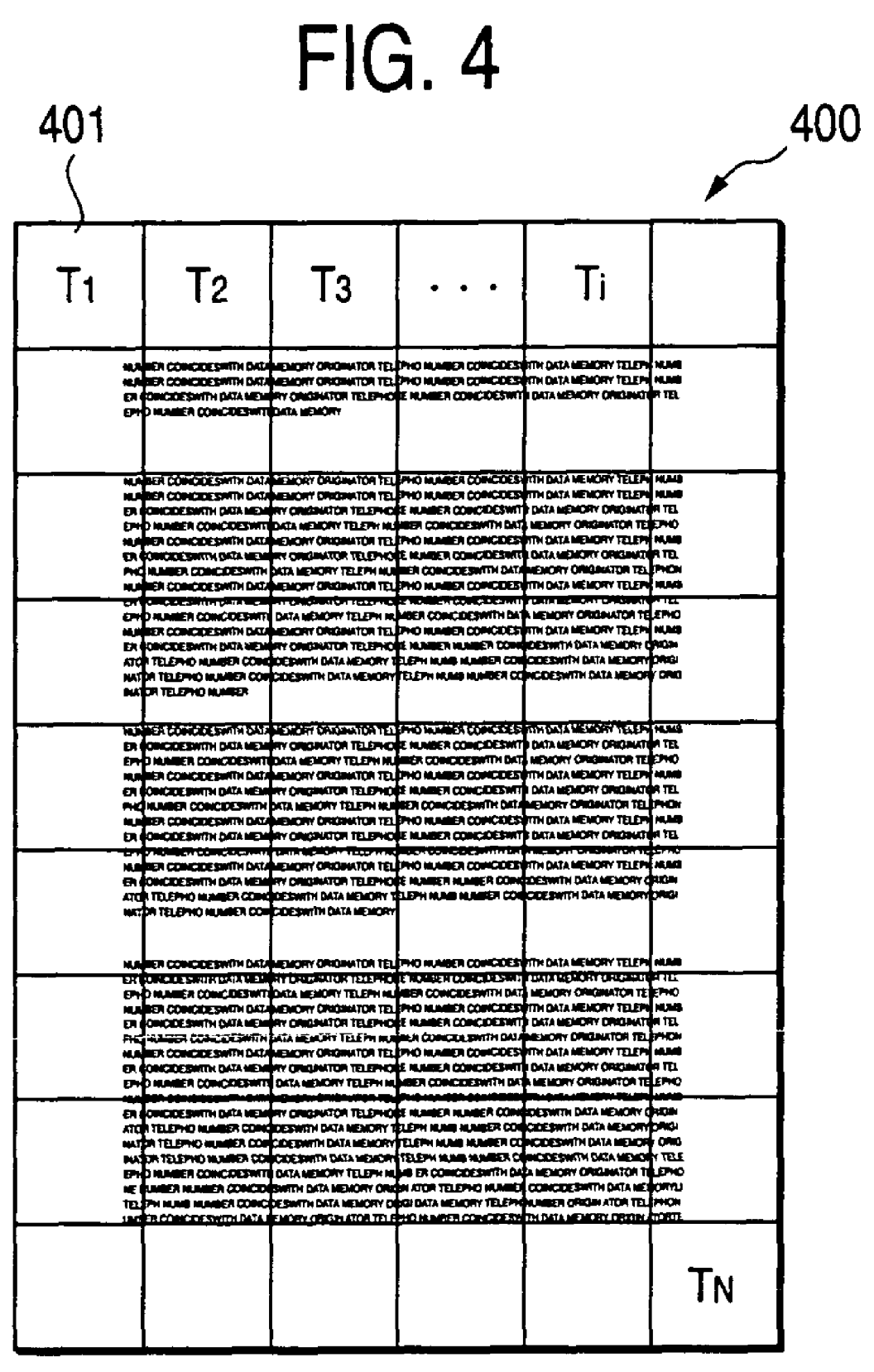

Next, a counter (not shown) is set to (i=1) (S320). As represented in FIG. 4, the reference image data is subdivided into N pieces of template images Ti (i=1 to N) in the template image producing section 117 (S321). The total number of subdivisions and a dividing method are desirably determined (when the reference image data is small, the small reference image data is not necessarily subdivided).

Also, when a defect inspection of an entire original area is not carried out, a partial area thereof may be subdivided.

Although positional resolution and size resolution are related to pixel numbers and capturing conditions of the CCD camera, generally speaking, the narrower the subdivision is made, the more both the positional resolution and the size resolution of defect in an image can be improved during defect detecting operation.

In this embodiment mode, while an image having an A4 size (defined by JIS) is employed as a defect scanned image for inspection, this image is preferably subdivided into approximately 50 to 1,000 image areas. However, the present invention is not limited to the above-described subdivision. Another subdivision method may be conceived. That is, while a subdivision number is selected to be a small number, a rough judgement as to whether or not a defect is present may be firstly carried out. Thereafter, while the image is further subdivided more finely, a precise judgement as to whether or not a defect is present may be carried out.

Next, one sheet of image among these subdivided images is taken as a template image 401 (see FIG. 4), which is used in a defect inspection. Then, data is embedded into the template image 401 by the data embedding section 120 (S322).

The gray scale value determining section 119 determines a gray scale value of the data to be embedded based on a statistical value (for example, average value, variance value, peak value, bottom value etc.) of pixel data of the template image (in this embodiment, the average value is used as the statistical value). Also, the gray scale value of the data to be embedded may be determined by employing a statistical value of extracted image data, instead of that of the template image.

When the average value of pixel data of the template image is larger than an intermediate gray scale value of an image (for example, 128 in case of 256 gray-scale levels), the gray scale value determining section 119 determines a value decreasing an average value of the pixel data of the template image as the gray scale value of the data to be embedded. Conversely, when the average value of pixel data of the template image is smaller than the intermediate gray scale value of the image, the gray scale value determining section 119 determines a value increasing the average value of the pixel data of the template image as the gray scale value of the data to be embedded.

Desirably, the gray scale value of the data to be embedded is set in such a manner that a normalized correlation value is not so changed over an entire area of a scanned image for inspection when no defect is present. For example, there is no specific change between a normalized correlation value when a template image of a white portion shown in FIG. 4 is used and another normalized correlation value when a template image of a character portion shown in FIG. 4 is employed.

In this embodiment mode, when the average gray scale value of the template image is larger than, or equal to 128, then the gray scale value data of 50 is embedded as the image data of 256 gray-scale levels. On the other hand, when the average gray scale value of the template image is smaller than, or equal to 128, then the gray scale value of 200 is embedded as the image data of 256 gray-scale levels. Alternatively, the gray scale value of the data to be embedded may be determined based upon a relative value with respect to an average gray scale value.

Figure 5:
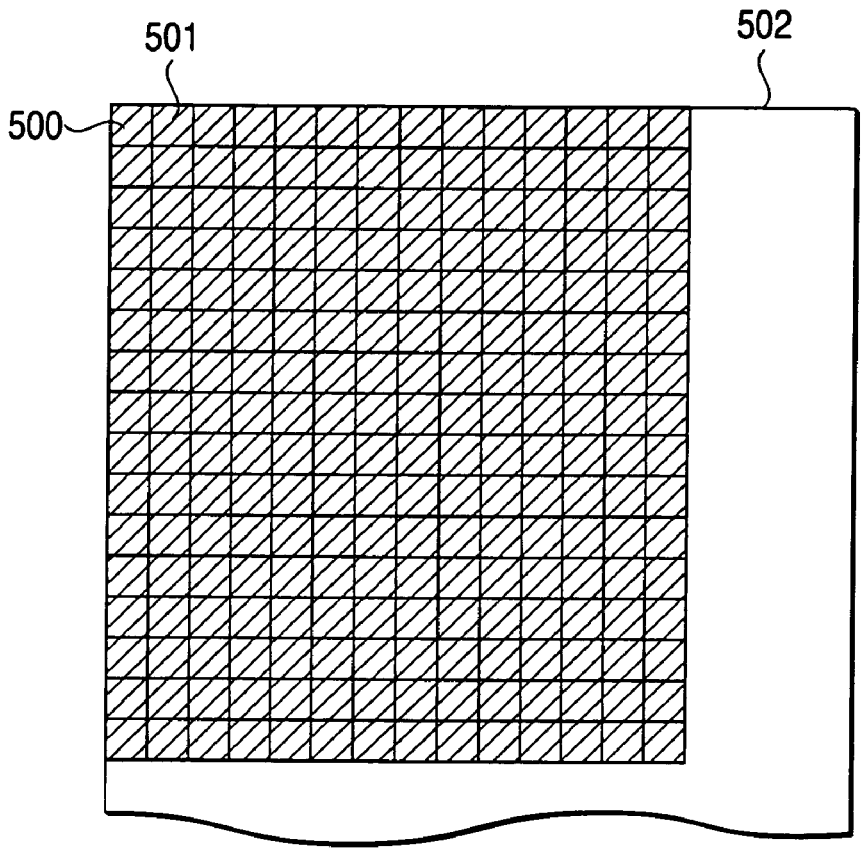
FIG. 5 is a diagram for indicating an arrangement of embedded data.
Figure 6:
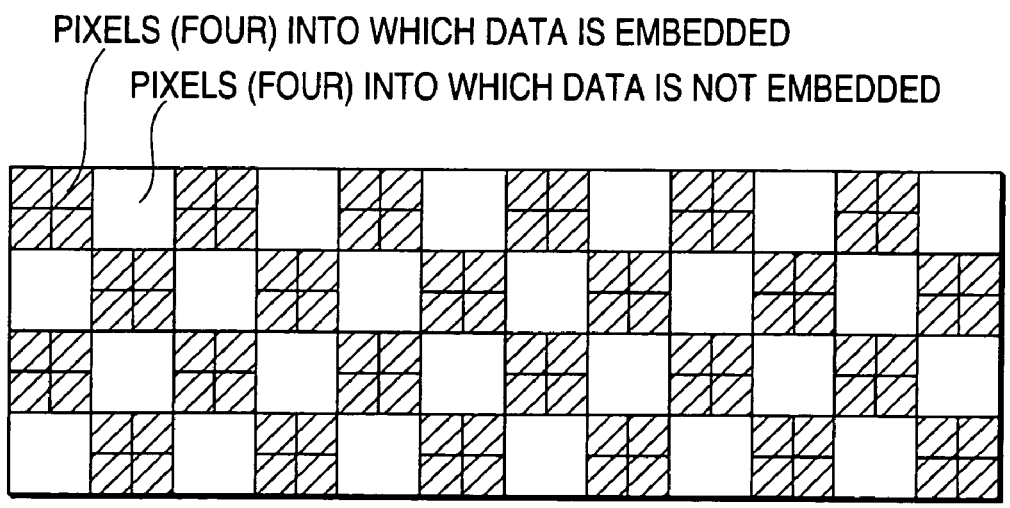
FIG. 6 is a diagram for representing an arranging example of embedded data in which a plurality of pixels are arranged in a checkered pattern.
Figure 7:
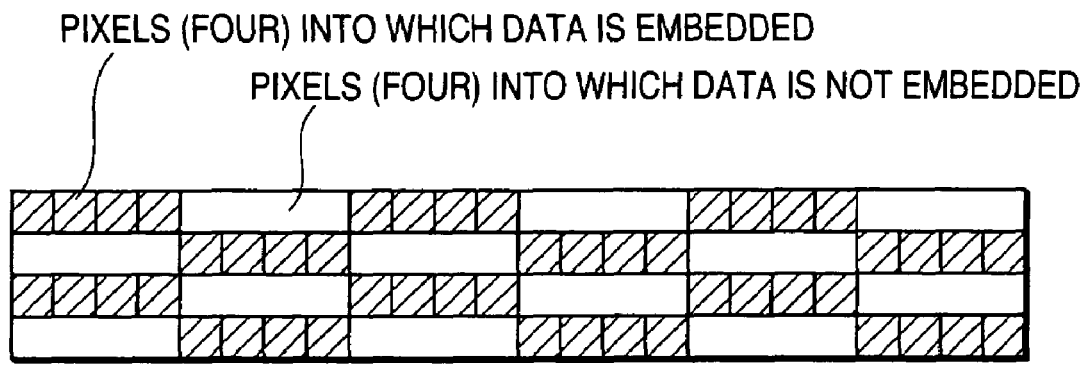
FIG. 7 is a diagram for representing another arranging example of embedded data in which a plurality of pixels are arranged in a checkered pattern.
Figure 8:
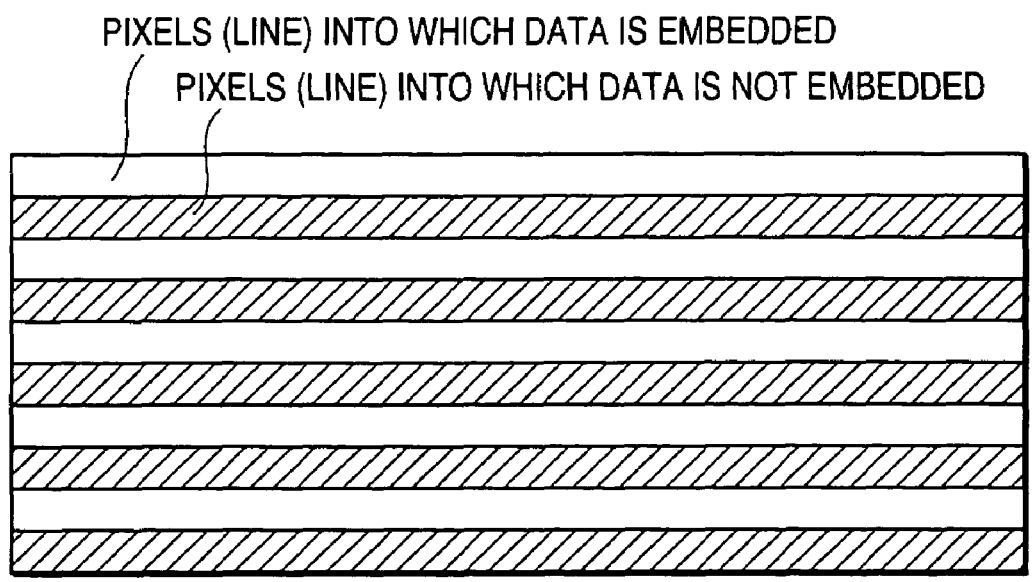
FIG. 8 is a diagram for representing an arranging example of embedded data in which a plurality of pixels are arranged in a line shape.

An arrangement of data to be embedded is determined in such a way that a variance value (otherwise, standard deviation) of the pixel data of the template image into which data has been embedded does not become zero. FIG. 5 represents such an example that a pixel 500 into which data have been embedded and a pixel 501 into which data have not been embedded are alternately arranged. The data to be embedded may be arranged so that units each including a plurality of pixels form checkered pattern as shown in FIG. 6 and FIG. 7. Otherwise, the data to be embedded may be arranged in a line-shape manner as shown in FIG. 8.

Next, the image to which the area cutting process operation (S318) has been executed is subdivided in the completely same manner to that of the reference image data. Tn image, which corresponds to the template image in a position and a size, is extracted from the scanned image for inspections.

Due to noise contained in a processing system, even such a scanned image for inspection having no defect cannot be completely made coincident with the reference image data. As a result, both the image corresponding to the template image in the position and a plurality of sheets of all images, which are located in the vicinity (within several pixels, for example, ten pixels) of the corresponding image are extracted (S324).

Furthermore, the data to be embedded, which have been produced based on the template image, are embedded into the plurality of extracted images in the completely same manner as S322 (S325). The normalized correlation calculating process unit 122 calculates normalized correlation values between the plurality of extracted images and the template image (S326).

It is assumed that an extracted image having the maximum normalized correlation value (S327) among the calculation results corresponds to the template image. A judgement is made as to whether or not the maximum normalized correlation value is larger than a threshold value of the defect judging section 123, which is subsequently disposed (S328).

When a position of a scanned image for inspection having no defect is completely made coincident with the position of the reference image data, only the image corresponding to the template image in the position may be extracted (S324). In this case, since there is only one calculation result as to the normalized correlation value (S326), the process operation for selecting the maximum value of the normalized correlation value (S327) is no longer required.

When a calculation result is larger than the threshold value, it is judged that a scanned image for inspection has no defect. When a calculation result is smaller than the threshold value, it is so judged that a scanned image for inspection has a defect. With regard to the threshold value of the defect judging section 123, an average normalized correlation value is previously calculated from a print image having no defect, and then the average normalized correlation value is employed as the threshold value.

It should also be noted that as to the data embedding operation, the data may be embedded only when the variance (or standard deviation) of the gray scale value of the template image is equal to zero or nearly equal to zero (for example, not more than 0.01).

When the maximum normalized correlation value is selected (S327), the count value of the counter is incremented by 1 (S329), and the result thereof is compared with the number N of the template images (S330). When the result is not equal to the number N of the template images, an i-th template image is selected in the process operation defined in the step S321, and then, a similar process operation is repeatedly carried out. In the case that i is equal to N in the step S330, the defect inspection is accomplished (S331).

When an image defect is detected in the process operation defined in the step S328, the subdivision number (namely, information related to size of defect), the value of i (namely, positional information), and the normalized correlation value (namely, information related to size and density of defect) are supplied to corresponding process operations. Therefore, approximation values as to the size, density, and position of the defect within the scanned image for inspection may be grasped.

At this stage, a warning notice may be issued on a user interface, and a warning notice may be issued to a personal computer, which tries to print out an image via a network by using print management software. Furthermore, a notification may be issued to a printer maintenance trader via a network by way of a remote maintenance system (S332).

Figure 9:
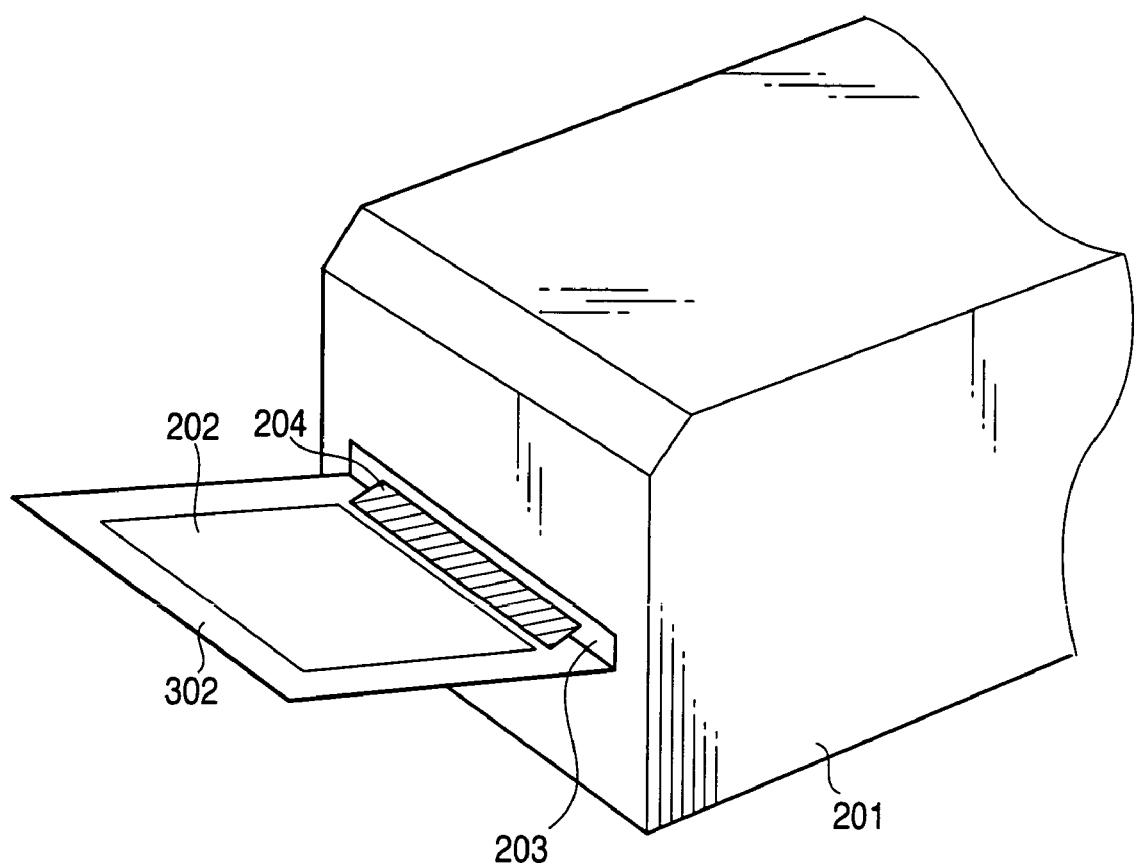
FIG. 9 is an outer view of an image defect inspecting apparatus in the case that a contact sensor is employed.

It should also be noted that in this embodiment, the CCD camera 106 has been employed as the unit for converting the scanned image for inspection into the digital data. Alternatively, as indicated in FIG. 9, a contact sensor (for example, line sensor) maybe provided at a paper ejection port. In this alternative case, the optical distortion correcting process (S311), the trapezoidal original area coordinate extracting process (S312), the correction coefficient calculation before fluoroscopic conversion process operation (S313), and the fluoroscopic converting process operation (S314) are no longer required.

As previously explained in detail, in accordance with the present invention, even in such a case that a variance value of the pixels of the template image is equal to zero, the defect present in the captured image (scanned image for inspection) corresponding to this template image can be found out by executing the value of the normalized correlation value by way of the very simple processing method. Furthermore, since the judgement as to the defect is present is made in the block unit, the approximated position of this defect, the approximated size of the defect, and also, the approximated density of the defect may be detected. Also, upon receipt of this defect detection result, this defect detection may be effectively utilized in the maintenance of printers and copy machines, so that service cost may be reduced.

What is claimed is:

1. An image defect inspecting apparatus for comparing a reference image data with a scanned image for inspection, which is output based on the reference image data from an image output apparatus and is formed on an image recording medium, to judge as to whether an image defect is present on the scanned image for inspection, the image defect inspecting apparatus comprising:

an image acquiring unit for acquiring the scanned image for inspection output from the image output apparatus to convert the acquired scanned image for inspection into digital data;

a storage unit for storing the reference image data and the digital data converted by the image acquiring unit;

a template image producing unit for producing a template image from the reference image data;

a corresponding image extracting unit for extracting a predetermined image located at a position corresponding to the template image from the digital data stored in the storage unit;

a data embedding unit for embedding desirable same pattern data into the template image and the predetermined image extracted by the corresponding image extracting unit;

a normalized correlation value calculating unit for calculating a normalized correlation coefficient from the template image and the extracted image, into which the same pattern data are embedded by the data embedding unit; and a defect judging unit for comparing the normalized correlation coefficient calculated by the normalized correlation value calculation unit with a predetermined threshold value to obtain large and small relation therebetween so that it is judged whether the scanned image for inspection contains a defect.

2. The image defect inspecting apparatus according to claim 1, wherein the template image producing unit subdivides the reference image data into subdivided image data having arbitrary shapes; and wherein one of the subdivided image data is employed as the template image.

3. The image defect inspecting apparatus according to claim 2, wherein the template image producing unit subdivides the reference image data so that the subdivided image data are equal to each other in number of pixels and have a rectangle shape.

4. The image defect inspecting apparatus according to claim 1, wherein the data embedding unit uses a statistical value of gray scale values within one of the template image and the extracted image to determine a gray scale value of the pattern data to be embedded.

5. The image defect inspecting apparatus according to claim 1, wherein when an average value of gray scale values within one of the template image and the extracted image is larger than an intermediate gray scale value, the data embedding unit determines a gray scale value of the pattern data to be embedded so that the average value of the gray scale value is increased; and wherein when the average value of the gray scale values within the one of the template image and the extracted image is smaller than the intermediate gray scale value, the data embedding unit determines the gray scale value of the pattern data to be embedded so that the average value of the gray scale value is decreased.

6. The image defect inspecting apparatus according to claim 1 wherein the data embedding unit determines an arrangement of the pattern data within one of the template image and the extracted image so that a variance value of the gray scale values within the one of the template image and the extracted image into which the pattern data is embedded is not equal 0.

7. The image defect inspecting apparatus according to claim 1, wherein the data embedding unit embeds the pattern data only when a variance value of gray scale values of the template image is not more than 0.01.

8. The image defect inspecting apparatus according to claim 1, wherein the data embedding unit determines an arrangement of the pattern data in the template image and the extracted image so that units each including at least one pixel of the pattern data form a checkered pattern.

9. The image defect inspecting apparatus according to claim 1, wherein the defect judging unit can obtain an approximate position, an approximate size, and an approximate density of the defect in addition to coincident degree between the template image and the extracted image and the judgement as to whether the defect is present in the scanned image for inspection.

10. The image defect inspecting apparatus according to claim 1, wherein the template image producing unit includes a unit subdivides the template image into small template images when the defect judging unit judges that the defect is present.

11. The image defect inspecting apparatus according to claim 1, wherein the template image producing unit extracts the, template image and a plurality of images, which are located within ten pixels from the template image.

12. The image defect inspecting apparatus according to claim 1, wherein the corresponding image extracting unit extracts the predetermined image, which is located at the position corresponding to the template image and has the same shape and the same image as those of the template image, and a plurality of images, which are located at positions within ten pixels from the template image and have the same shapes and the same sizes as those of the template image.

13. The image defect inspecting method for comparing a reference image data with a scanned image for inspection, which is output based on the reference image data from an image output apparatus and is formed on an image recording medium, to judge as to whether an image defect is present on the scanned image for inspection, the method comprising:

acquiring the scanned image for inspection output from the image output apparatus to convert the acquired scanned image for inspection into digital data;

storing the reference image data and the digital data converted by the image acquiring unit;

producing a template image from the reference image data;

extracting a predetermined image located at a position corresponding to the template image from the stored digital data;

embedding desirable same pattern data into the template image and the extracted predetermined image;

calculating a normalized correlation coefficient from the template image and the extracted image, into which the same pattern data are embedded; and comparing the calculated normalized correlation coefficient with a predetermined threshold value to obtain large and small relation therebetween so that it is judged whether the scanned image for inspection contains a defect.

14. The method according to claim 13, wherein the scanned image for inspection is outputted from the image output apparatus based on the reference image data.

* * * * *